United States Patent [19]

David et al.

[11] Patent Number: 5,212,014

[45] Date of Patent: May 18, 1993

[54] POLYCARBONATE SHEET LAMINATED TO PLASTICIZED POLYVINYL BUTYRAL SHEET

[75] Inventors: Donald J. David, Amherst, Mass.; Thomas F. Sincock, Weatogue, Conn.

[73] Assignee: Monsanto Company, St. Louis, Mo.

[21] Appl. No.: 789,495

[22] Filed: Nov. 8, 1991

[51] Int. Cl.⁵ .................... B32B 27/36; B29C 47/00
[52] U.S. Cl. .................... 428/412; 428/425.6; 428/437; 264/176.1; 264/177.1
[58] Field of Search .................... 428/412, 425.6, 437

[56] References Cited

U.S. PATENT DOCUMENTS

| | | | |
|---|---|---|---|
| 4,514,464 | 4/1985 | Gomez | 428/412 |
| 4,537,828 | 8/1985 | Gomez | 428/412 |
| 5,028,658 | 7/1991 | David et al. | 525/58 |

*Primary Examiner*—P. C. Sluby
*Attorney, Agent, or Firm*—Michael J. Murphy; Richard H. Shear

[57] ABSTRACT

A laminate comprising a sheet of polycarbonate laminated to another sheet comprising, on a weight basis, a) 30 to 90% polyvinyl butyral and b) 70 to 10% thermoplastic polyurethane, containing a plasticizing amount of one or more $C_2$–$C_5$ alkanediols or diethylene glycol.

8 Claims, No Drawings

POLYCARBONATE SHEET LAMINATED TO PLASTICIZED POLYVINYL BUTYRAL SHEET

BACKGROUND OF THE INVENTION

This invention relates to a laminate particularly for a security application and more specifically to such a laminate which includes a plasticized sheet containing polyvinyl butyral (PVB).

Laminated glazings containing an impact-absorbing plastic layer are known for use as vehicle and building windows, skylights and the like. One form of such glazing is used in security applications such as prison windows, retail (jewelry) casings, bullet and burglar-resistant doors and windows for airport checkpoints, storefronts, witness (courtroom) protection and the like. A security glazing includes one or more layers of clear polycarbonate (PC) to significantly increase impact resistance. Since PC is susceptible to atmospheric degradation, security glazings preferably also include one or more glass layers to protect the PC. Since PC does not adhere well to glass, an interlayer between the PC and glass is used which adheres well to both the glass and PC. Plasticized PVB qualifies as such an interlayer but plasticizers traditionally used with PVB are known to stress crack or craze (minute surface cracks) PC which causes haze in the laminate and destroys its optical properties. Consequently, it is further known (see e.g. U.S. Pat. Nos. 4,128,694 and 4,514,464) to use a plasticizer for PVB which does not damage PC when the two are in laminating contact. Though PC-resistant plasticizers for PVB are known, their efficacy in avoiding stress cracking could be improved.

SUMMARY OF THE INVENTION

Now, improvements have been made in security glazings which alleviate shortcomings of the prior art.

Accordingly, a principal object of this invention is to provide an improved laminate for use with glass in a glazing which includes plasticized PVB and PC as components.

Another object is to provide an improved sheet containing plasticized PVB for use as an interlayer between PC and glass in a security glazing.

A further object is to provide improvements in such sheet through selection of a plasticizer which does not craze the PC with which the sheet is in adherent contact.

Other objects of this invention will in part be obvious and will in part appear from the following description and claims.

These and other objects are accomplished by providing a laminate comprising a sheet of polycarbonate laminated to another sheet comprising, on a weight basis, a) 30 to 90% polyvinyl butyral and b) 70 to 10% thermoplastic polyurethane, containing a plasticizing amount of one or more $C_2$-$C_5$ alkanediols or diethylene glycol.

DETAILED DESCRIPTION OF THE INVENTION

The plasticized sheet component of the invention is intended for laminated adhesion to PC and glass—either through simultaneous contact with each side of such sheet or with one side where other layers are present between the plasticized PVB sheet and the PC or glass. The polymeric component of such sheet comprises on a weight basis, 30-90%, preferably 30-70%, PVB and 70-10%, preferably 70-30% thermoplastic polyurethane (TPU). The PVB and TPU are preferably combined in a thermoplastic polyblend before shaping into sheet.

The PVB component of the polyblend has a weight average molecular weight greater than 100,000 preferably about 150,000 to 250,000 as measured by size exclusion chromatography using low angle laser light scattering. Such PVB comprises on a weight basis 15 to 30%, preferably 18 to 25%, hydroxyl groups, calculated as polyvinyl alcohol; 0 to 5% preferably 0 to 3%, ester groups, calculated as polyvinyl ester, e.g. acetate with the balance being butyraldehyde acetal.

PVB resin is produced by known aqueous or solvent acetalization wherein polyvinyl alcohol is reacted with butyraldehyde in the presence of an acid catalyst to produce PVB, followed by neutralization of the catalyst, separation, stabilization and drying of the PVB resin.

The TPU component of the polyblend must be a preformed thermoplastic polyurethane which is uncrosslinked. Reactive crosslinkable polyurethanes are not usable because of the chemical reaction which will occur with hydroxyls of the PVB component during heat processing of the polyblend. Functional TPU,s contain hard and soft segments formed respectively of polymerized diisocyanate and polyol components. The ratio or weight % of hard to soft segments determines the physical properties of the TPU. In synthesizing TPU a difunctional chain extender such as a diol or diamine is used to space diisocyanate molecules in the polymer chains. A prepolymer of diisocyanate and difunctional chain extender is preferably first prepared to avoid toxicity problems associated with handling monomeric isocyanate.

The diisocyanate can be saturated aliphatic, either linear or cycloaliphatic (including mixtures of same) or aromatic (including mixtures of same) or mixtures of aliphatic and aromatic diisocyanates. Cycloaliphatic diisocyanates are preferred and comprise cyclohexyl diisocyanate having one or two cyclohexyl ring groups. Methylene bis (4-cyclohexyl) diisocyanate is most preferred.

The polyol component of the TPU is a polyether polyol or a mixture or polyether I0 polyol(s) and polyester polyol(s), such as linear long chain polyether or polyester diols, the molecular weight of which determines the hardness of the TPU and its compatibility in a polyblend with PVB. By selectively choosing polyol molecular weight and blending the TPU obtained with PVB, it is possible to obtain a family of mechanically and optically compatible polymers Preferred polyols are polyether polyols such as polytetraalkylene ether glycols where alkylene is $C_1$-$C_4$. For optimum compatibility in a polyblend, polytetraalkylene ether glycol molecular weight should be between about 90 to 4000, preferably 650 to 3000.

The plasticizer in the PVB-TPU sheet component of the invention must be compatible with both the PVB and TPU constituents insofar as staying dispersed and not exuding to the surface of nor developing excess haze in the sheet. It must also reduce melt viscosity of the PVB-TPU mixture at elevated processing temperatures to facilitate shaping into sheet and subsequent laminating of the sheet using conventional equipment. Lowering melt viscosity facilitates melt processing using minimal heat to avoid or minimize crosslinking the PVB and TPU. Equally important, however, is the critical requirement that such plasticizer not stress crack or craze PC when dispersed in the sheet at concentrations providing the desired melt viscosity during melt processing. Such plasticizers of the invention which fulfill the foregoing requirements are one or more $C_2$-$C_5$, preferably $C_2$-$C_4$, alkanediols (most preferably 1,4 butanediol or propanediol) or diethylene glycol. Any $C_2$-$C_5$ alkanediol isomer can be used. When the number of carbon atoms in an alkanediol increases beyond five the molecule is thought to be insufficiently polar leading to incompatibility with the PVB-TPU system.

The effective amount of plasticizer in the sheet to meet the foregoing noted requirements is less than the amount used in PVB sheet without TPU. Usually 3 to 15, preferably 5 to 15 parts plasticizer per 100 parts of combined, PVB and TPU is an appropriate plasticizing amount.

The polycarbonate component with which the plasticized PVB-TPU sheet is intended to contact may be any suitable sheet of polycarbonate such as disclosed in U.S. Pat. Nos. 3,028,365 and 3,117,019. Such PC may be prepared by reacting di(monohydroxyaryl)-akanes with derivatives of carbonic acid such as phosgene and bischlorocarbonic acid esters of di-(monohydroxy-aryl)-alkanes. Commercial polycarbonate sheeting is available from General Electric Company under the trademark LEXAN. PC layer thickness varies with the impact absorption desired to be provided by it in the laminate. Usually thicknesses of 125 to 750 mils (3 to 19 mm) preferably 250 to 500 mils (6 to 13 mm,) are adequate for security glazings.

The forming operation to prepare plasticized PVB-TPU sheet is according to procedures known in the art. The PVB and preformed TPU are melt blended together in the presence of the plasticizer by physically working at temperatures of about 150° to 210° C., followed by shaping of the melt into clear, transparent sheeting having a thickness of about 5 to 50 (preferably about 30) mils (0.13 to 1.3 mm). Shaping from the melt can be by extrusion using a screw extruder or by compression molding, mill rolling or like process. Preferred shaping systems for commercial rates involve extrusion of the plasticized melt blend through a conventional sheeting die, i.e. forcing the molten polymer through a horizontally long, vertically narrow die opening substantially conforming in length and width to that of the sheet being formed, or by using a die roll system, i.e. by casting the molten polymer issuing from an extrusion die onto a specially prepared surface of a die roll in close proximity to the exit of such die.

Conventional techniques known to those skilled in the art can be used in association with the extrusion process to produce a rough surface on one or both sides of the extruding sheet. These involve the specification and control of one or more of the following: polymer molecular weight distribution, water content of the melt, melt and die exit temperature, die exit geometry etc. Systems describing such techniques are disclosed in U.S. Pat. Nos. 2,904,844; 2,909,810; 3,994,654; 4,575,540 and published European Application No. 0185,863.

The plasticized sheet of the invention can be used to make a simple laminate wherein at least one surface of the sheet is in laminating contact with a PC sheet. Usually one of the surfaces of the PVB-TPU sheet will be in contact with a different material such as glass. For security glazings it is usual to provide multiple, such as four or more, layers of plasticized PVB-TPU, PC and glass laminated together to form laminate thicknesses of from ½ (1.3 cm) to several inches in thickness. For such purposes the construction usually comprises glass/ PVB-TPU/PC/PVB-TPU/glass units multiplied as appropriate.

The laminates produced using the plasticized PVB-TPU sheet of the invention may be treated to reduce light transmission by tinting or by providing a metallized surface on one or more of the layers. The treatment can be such as to produce a uniform reduction in light transmission over the whole sheet or as a band or other form of localized effect.

Laminates according to the invention are broadly useful in any application requiring a safety glass assembly such as a vehicular windshield, but are especially useful in security applications such as prisons without bars and installations requiring a somewhat lesser degree of security such as bank windows, cashier booths, jewelry counters and the like. Applications in which laminates of the invention can be used are disclosed in U.S. Pat. No. 4,243,719, col. 10, line 3 through col. 12, line 36, the content of which is incorporated herein by reference.

In addition to plasticizer, the PVB-TPU sheet of the invention may containg other additives such as dyes, ultraviolet light stabilizers, salts to control adhesion, antioxidants and the like.

The invention is further described with reference to the following examples which are for illustration only and are not intended to imply any limitation or restriction on the invention. Unless indicated otherwise, parts and percentages are by weight.

Values for the various properties presented in the Examples were determined according to the following procedures.

1) Peel Adhesion (N/cm) measures bond strength between plasticized PVB-TPU sheet and glass or PC. Adhesive coated aluminum foil is initially conditioned at 105° C. for 30 min. Special laminates containing the plasticized PVB-TPU sheet being tested are prepared using standard laminating techniques but substituting the conditioned aluminum foil for one glass (or PC) piece of a standard double glass (or PC) layered laminate. The thickness of the plasticized PVB-TPU layer is standardized at 30 mils (0.76 mm). In preparing such special laminates, the coated foil is assembled to one side of the PVB-TPU layer with the adhesive next to the PVB-TPU layer and a glass or PC layer assembled to the other side of the PVB-TPU layer. Two such laminates with the foil surfaces in face-to-face contact are then passed through deairing rolls. The laminates are then placed singly, with foil down, in a circulating air oven at 105° C. for 20 minutes. The hot laminates are then assembled, rerolled as before and autoclaved at 295° F. (146° C.) at 185 psi (1.3M Pa). After autoclaving a 4 cm wide cut is made through the foil and PVB-TPU layer. The glass or PC at one end of the laminate is then scored and broken. The outside edge of the aluminum foil and PVB-TPU layer on each side of the 4 cm strip is cut at the glass or PC break. At least three samples of a specific laminate are tested per reported value. Prior to measuring peel strength, the samples are conditioned overnight at 21° C. During peel testing the sample of glass or PC, foil and PVB-TPU layer are clamped in testing grips of an Instron peel tester (crosshead speed of 5 in (12.7 cm) per min) and a direct recorded measurement made of the force necessary to separate the PVB-TPU layer from the glass or PC. The average of the various recorded peaks is the value for the sample.

2) Pummel Adhesion—(no units) also measures sheet adhesion to glass. 0.76 mm thick sheets of plasticized PVB-TPU were placed between two 15.2 cm×10.2 cm×0.23 cm plates of float glass. These layers were then held in an autoclave for about 7 min. at 1.3 MPa, 135° C. to laminate the glass and sheet. The laminates were then conditioned to minus 17° C. and manually pummeled with a 1 pound (454g) hammer to break the glass. All broken glass unadhered to the PVB-TPU layer was then removed. The amount of glass left adhered to the PVB-TPU layer was visually compared to a set of standards of known pummel scale, the higher the number of the standard, the more glass remaining adhered to the interlayer—i.e. at a pummel of zero, no glass at all is left whereas at a pummel of 10, 100% of the sheet surface is adhered to the glass. Desirable impact dissipation occurs at a pummel adhesion value of 3 to 8.5. At less then 3 too much glass is lost whereas at more than 8.5 adhesion is generally too high and shock absorption is poor.

3) PC Stress Cracking— a) PC sheet (LEXAN ® glazing grade from General Electric Co.) 0.6 cm thick was compression molded at about 243° C. to reduce thickness to about 0.07 cm. Strips (11 cm long×1.3 cm wide) cut from the molded pieces were bent (to stress the PC) to conform to the 5 cm inside diameter of a cylindrical glass jar and placed within such jar. Sufficient plasticizer to just cover the PC strip was added. Such stressed strip immersed in plasticizer was held at room temperature for 18 hrs. The PC strip was then extracted and visually examined under a bright light for stress cracking. Rating was on a scale of 1 to 10 (1- good; 10-poor).

EXAMPLE 1

PREPARATION OF PLASTICIZED PVB-TPU SHEET

PVB used was Butvar ® resin from Monsanto Company in powder form containing 18% polyvinyl alcohol.

TPU was TECOFLEX EG-85A from Thermedics Inc. of Woburn, MA in pellet form. This TPU was the reaction product of cycloaliphatic isocyanate, i.e. methylene bis (cyclohexyl) diisocyanate, polyether polyol i.e. poly(tetramethylene ether glycol) and 1,4 butanediol as chain extender. The molecular weight of the polyol was 2000.

The PVB and TPU pellets (60/40 PVB/TPU weight ratio) were dried in hot air to less then 1% $H_2O$ and then tumble blended. 1,4 butanediol (7.5 parts per hundred parts PVB-TPU) was added as plasticizer during tumble blending where it was dispersed in and absorbed by the polymer solids. The plasticized blend was then charged to a Brabender intensive mixer maintained at 190° C. and mixed until fluxed (i.e. as a fused polyblend of the components) and then for 4 additional minutes. Mixer blades were rotating at about 70 rpm. The blends were removed from the mixer and cooled to room temperature. Thirty mil (0.76 mm) sheets were compression molded from the blends using heated (350° F./176.7° C.) platens at a pressure of 4000-5000 psi (27,560-34,450 kPa). The platens were faced with Mylar ® film to minimize sticking. Sheet samples were cooled to room temperature while in the press.

EXAMPLE 2

This examines performance of the sheet of Example 1 at various plasticizer loadings in laminates with i) glass and PC and ii) PC.

Laminates (8 cm×8 cm) of the plasticized sheet of Example 1 with polycarbonate (two ply no glass) and with glass and PC (three ply) were prepared. PC was 0.6 cm thick glazing grade LEXAN ® from General Electric Co. Laminating cycle (PC and glass) was 160° C., 1550 kPa for 20 min. Layer sequence in the glass laminates was glass/PVB-TPU/PC. Five laminates were tested with the average for the five reported. Results were as follows:

| Plasticizer (phr) | Pummel | Peel Glass | (N/cm) PC | Stress Cracking |
|---|---|---|---|---|
| 0 | 8 | >80 | >80 | None |
| 7.5 | 8 | >50 | 33 | None |
| 15.0 | 7.5 | 44 | 8 | None |

The above data indicates adhesion to glass and PC is reduced as 1,4 butenediol is increased. The 33N/cm value at 7.5 phr is considered adequate adhesion. Stress cracking was evaluated at room temperature and represents an observation of the lack of any visible haze when looking through the laminates.

EXAMPLE 3

This shows the propensity of various plasticizers to stress crack PC.

Using the PC Stress Cracking test previously described, the following results were obtained:

| Plasticizer | Visual Cracking | Rank |
|---|---|---|
| 1,4 Butanediol | none | 1 |
| Propylene glycol | very slight @ edges | 2 |
| Diethylene glycol | slight @ edges | 3 |
| Ethylene glycol | moderate | 3.5 |
| [1]Propylene glycol monoricinoleate/ castor oil (70/30 wt. ratio) | extensive | 4 |
| Dipropylene glycol | extensive | 5 |
| 1,6 hexane diol | extensive[2] | 5 |
| Triethylene glycol | severe | 6 |
| Polytetramethylene glycol | most severe | 7 |

[1]A plasticizer mixture for PVB for use with PC disclosed in U.S. 4,537,828.
[2]At 45° C. since solid at room temperature.

The above data shows the absence or tolerable (none to moderate) stress crack performance of plasticizers of the invention when in contact with stressed PC. Equivalent performance is expected when such plasticizers are dispersed in sheet formed from a polyblend of PVB and TPU at 3-15 phr and then brought into contact with stressed PC.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A laminate comprising a sheet of polycarbonate laminated to another sheet comprising, on a weight basis, a) 30 to 90% polyvinyl butyral and b) 70 to 10% thermoplastic polyurethane, and containing as plasticizer 3 to 15 parts per 100 parts of combined polyvinyl butyral and thermoplastic polyurethane of one or more $C_2$–$C_5$ alkanediols or diethylene glycol.

2. The laminate of claim 1 wherein the alkanediols in said another sheet comprise butanediol or propanediol.

3. The laminate of claim 2 wherein the alkanediol is butanediol.

4. The laminate of claim 3 wherein the butanediol is 1,4 butanediol.

5. The laminate of claim 4 including at least one sheet of glass laminated to said another 6. The laminate of any of clams 1, 2, 3, 4 or 5 wherein said another sheet comprises 30 to 70% polyvinyl butyral and 70 to 30% thermoplastic polyurethane.

7. The laminate of claim 6 wherein components a) and b) of said another sheet were a polyblend before shaping into said another sheet.

8. The laminate of claim 7 wherein the polyurethane is the reaction product of cycloaliphatic diisocyanate and polyether polyol.

* * * * *